United States Patent [19]
Gardner

[11] Patent Number: 5,263,290
[45] Date of Patent: Nov. 23, 1993

[54] MODULAR ASSEMBLY FOR FIRE-SAFETY SPRINKLER, HEATING/COOLING, AND LIGHTING/COMMUNICATION SYSTEM INSTALLATIONS

[76] Inventor: Ernest A. Gardner, 142½ Canal Ave., NW., Canal Fulton, Ohio 44614

[21] Appl. No.: 779,979

[22] Filed: Oct. 21, 1991

[51] Int. Cl.$^5$ .............................................. E04B 9/02
[52] U.S. Cl. ...................... 52/220.6; 52/39; 52/218; 52/219; 454/293; 454/301; 165/53
[58] Field of Search .................. 52/28, 39, 218, 219, 52/220, 221, 198, 220.6; 454/263, 292, 293, 301; 165/53; 237/49, 70; 439/207, 215

[56] References Cited

U.S. PATENT DOCUMENTS

| | | | |
|---|---|---|---|
| 2,762,398 | 9/1950 | Adam | 52/220 |
| 2,888,113 | 5/1959 | Schwartz et al. | 52/28 |
| 3,187,660 | 6/1965 | Lazerson | 454/293 |
| 3,193,001 | 7/1965 | Meckler | 454/293 |
| 3,343,310 | 9/1967 | Netz et al. | 52/28 |
| 3,512,313 | 5/1970 | Harz | 52/28 |

*Primary Examiner*—Carl D. Friedman
*Assistant Examiner*—Robert J. Canfield
*Attorney, Agent, or Firm*—Paul E. Milliken; Lee A. Germain

[57] ABSTRACT

A modular assembly applicable to building constructions combines fire-safety sprinkler system piping, heating and cooling system heat exchangers, and lighting system fixtures and communication system wiring into an integrated unit installation. A channel which defines an enclosed duct for the passage of air is mounted in association with sprinkler system piping while a condensate pan is mounted in association with heating and cooling system heat exchangers. An air diffuser is positioned vertically between the channel and pan to direct environmental and make-up air about the heat exchangers for conditioning and a lighting fixture is positioned below the condensate pan. The channel, pan, and lighting fixture are all in standardized lengths and are maintained in a vertical alignment below the sprinkler system piping by a plurality of brackets, straps, and fasteners, various of the brackets being mounted over the channel and piping while others are mounted below the pan and lighting fixture. The straps and fasteners interconnect the brackets in vertically aligned positions such that longitudinally positioned channels, pans, heat exchangers, and lighting fixtures may be interconnected below the sprinkler system in accordance with their individual system requirements.

29 Claims, 4 Drawing Sheets

MODULAR ASSEMBLY FOR FIRE-SAFETY SPRINKLER, HEATING/COOLING, AND LIGHTING/COMMUNICATION SYSTEM INSTALLATIONS

FIELD OF THE INVENTION

This invention pertains generally to the construction industry and, more particularly, to the construction trades as may be involved in fire-safety sprinkler, heating/cooling, and electrical lighting/communication system installations.

More specifically, the present invention provides a modular assembly as may be applied for use by the construction trades wherein fire-safety sprinkler, heating/cooling, and lighting/communication systems may all be integrated into a single standardized and sequentially fabricated unitary type structure which supplies all of the various functions of these systems.

BACKGROUND OF THE INVENTION

In the construction of commercial and other types of building structures, the contractors and/or sub-contractors involved in the construction follow a building schedule so that one group of tradespersons does not interfere with a different group in attempting to accomplish their portion of the construction. For example, a heating/cooling contractor must oftentimes install his type of equipment in the same or contiguous spaces as a plumbing and/or electrical contractor. In this situation, the various trades are scheduled in accordance with well-known and understood practices. Many times, however, this scheduling gets fouled up due to circumstances beyond the control of those involved such as, for example, delays in delivery of equipment needed for a particular installation. Should one contractor effect an installation of equipment before another who should have made his first, a controversy may follow which affects the total project timetable. Those who work in this industry know only too well how such controversies affect their business.

The present inventive concept intends to substantially eliminate timetable controversies between at least a few of the building construction trades by the provision of a modular assembly which may be used either sequentially and/or concurrently by particular trades such that various projects may be timely completed and in a hassle-free manner.

It is, therefore, in accordance with one aspect of the present invention an object to provide a modular assembly comprised of elements which may be made from various materials and in standardized dimensions such as to be usable in various configurations by the construction trades.

In accordance with another aspect of the invention, it is an object to provide a modular assembly comprised of elements each of which may be fabricated from readily available and economically purchased materials and in large quantities such that heating and cooling and lighting and communication systems may be installed in conjunction with fire-safety sprinkler system piping.

In accordance with still another aspect of the invention it is an object to provide a modular assembly applicable to the installation of fire-safety sprinkler piping, heating and cooling heat exchangers, and electrical lighting and communication fixtures and wiring wherein various elements of the modular assembly may be used by the persons involved as the installations of these functional systems are made.

SUMMARY OF THE INVENTION

The advantages of the present invention as alluded to above are accomplished in a modular assembly applicable to the installation of fire-safety sprinkler piping, heating and cooling heat exchangers and, lighting and communication fixtures and wiring comprising in combination:

a channel member adapted for hanging from the fire-safety sprinkler piping, which member defines a duct for passing environmental make-up air to a living space below;

a condensate pan positioned vertically below the channel member and adapted for carrying heating and cooling system heat exchangers therein;

means positioned between the channel member and condensate pan to direct make-up air and other available living space air to the volume space occupied by the heat exchangers; and a plurality of U-shaped brackets mounted from the top of the channel member, the bottom of the condensate pan, and the bottom of the lighting fixture and interconnected by a plurality of fastening means to maintain the channel, the pan, and the lighting fixture in a stable vertical orientation one with respect to the other.

BRIEF DESCRIPTION OF THE DRAWINGS

The various advantages of the present invention will be best appreciated and understood from a consideration of the following detailed description when taken in conjunction with the accompanying drawings, in the several figures in which like-reference numerals are used to identify like members and wherein.

DETAILED DESCRIPTION OF THE INVENTION

Figure 1:
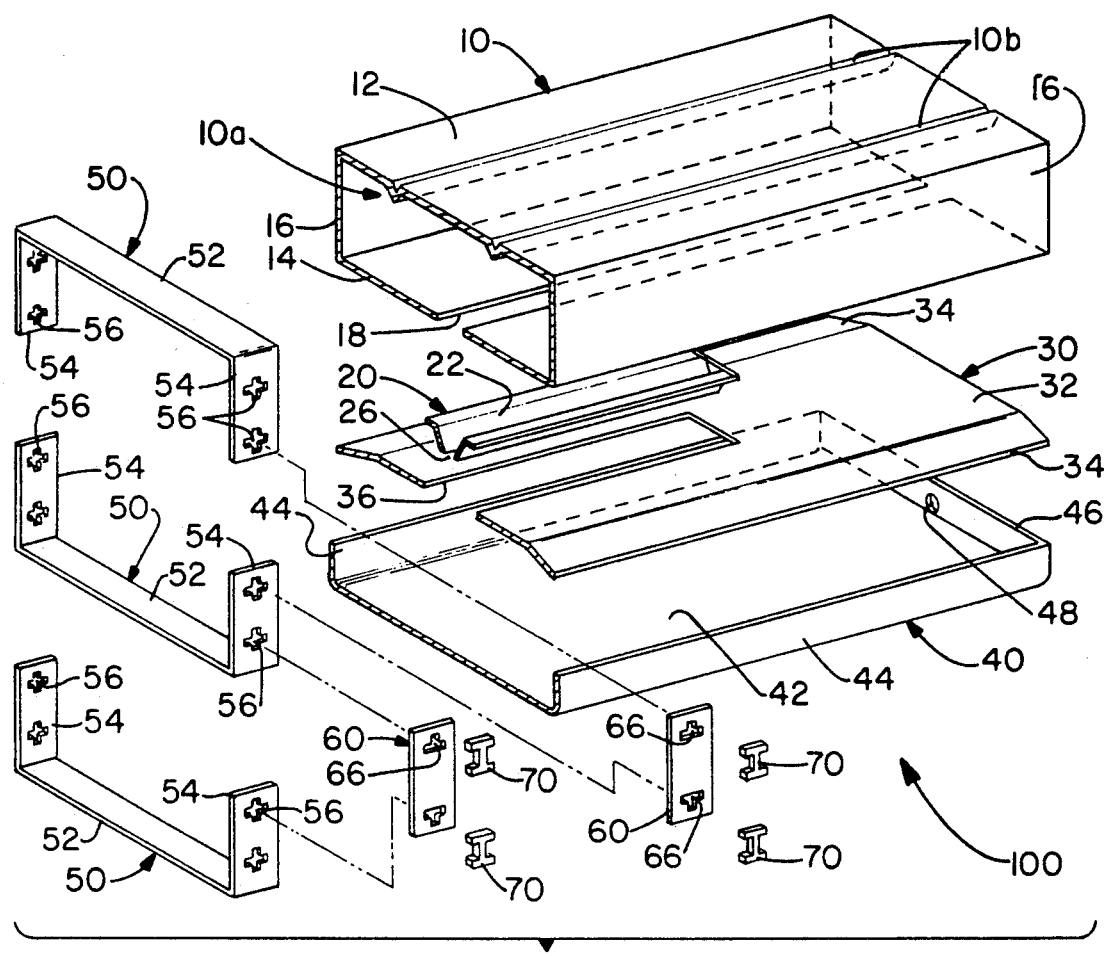
FIG. 1 is an assembly drawing, in perspective, showing the various component members which comprise the modular assembly of this invention.

With reference to the drawings, FIG. 1 illustrates the various member elements which comprise a modular assembly in accordance with the present inventive concept. The assembly is generally indicated by reference numeral 100 and it will comprise (a) a substantially rectangularly-shaped channel member 10, (b) a substantially V-shaped diffuser member 20, (c) a baffle plate member 30, (d) a condensate pan member 40, (e) a plurality of substantially U-shaped bracket members 50, (f) a plurality of strap members 60, and (g) a plurality of fastening means 70.

The rectangularly-shaped channel member 10 may be characterized by top, bottom, and side walls 12, 14, and 16 respectively and these define a channel bore 10a extending throughout the longitudinal length of the channel. The channel member 10 may also be described as a substantially enclosed duct and it may be of various lengths but, preferably, it will extend longitudinally about 48 inches (1.22 meters) in length. It will, of course, be recognized that the drawing only shows a portion of one terminal end of the channel 10 so as to facilitate getting it in the illustration and this is also true of other lengthy members of the assembly to be described hereinafter. The channel member 10 is further characterized by a longitudinally extending slot opening 18 which divides the bottom wall 14 into two equal halves. The width extent of the slot opening 18 is such as to facilitate mounting of a diffuser member 20 in a manner and for the purpose to be discussed. The channel member 10 may also be characterized by longitudinally oriented indented ribs indicated at 10b which operate to strengthen the walls of the channel in a manner well-known in the arts.

Figure 7:
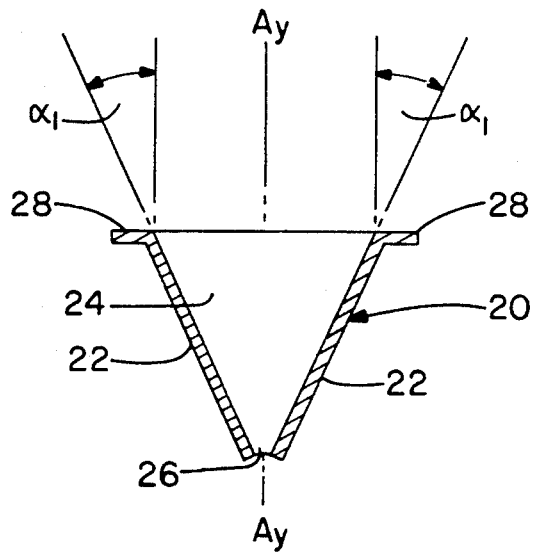
FIG. 7 is an end view, in cross-section, of an air diffuser member forming an integral part of the modular assembly of this invention.

The diffuser member 20, which is also more clearly shown in FIG. 7 of the drawings, is characterized by a substantially V-shaped vertical cross-section which is defined by a pair of side walls 22 maintained in position by end walls 24 only one of which is shown in the drawing. The side walls 22 are both angularly disposed with reference to a vertical axis indicated at $A_y$ and with respect to each other. The angle is indicated at $\alpha_1$ and it may be within the range of 10-30 degrees but, preferably, it will be about 25 degrees as shown. The angle $\alpha_1$ is such as to define a slot opening 26 which extends the longitudinal length of the diffuser member 20 between the end walls 24 and it may vary within the range of 0.001-0.10 inch (0.0254-2.54 mm) and this will depend upon certain design specifications of the heating and cooling system as will be apparent as this description proceeds. The diffuser member 20 may be further characterized by a pair of top flanges 28 which extend horizontally away from each of the side walls 22 and at the top edge thereof. The flanges 28 are for the purpose of maintaining the diffuser member 20 in a vertically mounted and oriented position within the slot opening 18 in the channel member 10 and this arrangement of the diffuser and channel members is more clearly illustrated in FIG. 2 of the drawings.

Figure 8:
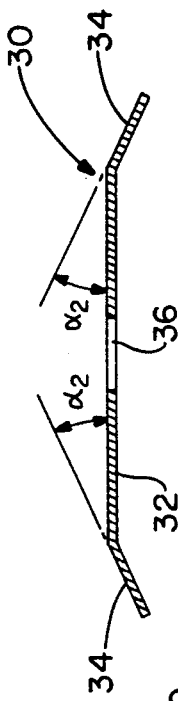
FIG. 8 is an end view, in cross-section, of a baffle member forming another integral part of the modular assembly.

The baffle member 30, which is also illustrated in FIG. 8 of the drawings, comprises a substantially flat plate 32 having length and width dimensions substantially equal to the length and width dimensions of the channel member 10. The baffle member 30 may be characterized by downwardly depending side flanges 34 and these may be bent from the flat plate 32 at an angle indicated at $\alpha_2$ which may be within the range of 10-30 degrees as shown. Preferably, the angle $\alpha_2$ will be about 25 degrees with respect to the flat plate 32. The baffle member 30 is further characterized by a longitudinally extending slot opening 36 which extends for the substantial, but not the total, length of the flat plate 32. Actually, the slot opening 36 will be substantially equal to the length of the diffuser member 20 as the diffuser member will be mounted through the slot opening 36 for the purpose to be described hereinafter.

The condensate pan member 40 is defined by bottom, side, and end walls 42, 44, and 46 respectively and it has an overall length substantially equal to the length of the channel member 10. Its width dimension may vary but, preferably, it will be substantially equal to the width dimensions of the channel and baffle members. The side walls 44 and end walls 46 need not be more than 1.0 inch (2.54 cm) in height and the end walls are each characterized by through bores 48 which are for the purpose of draining condensate liquid which may collect in the pans 40.

Figure 5:
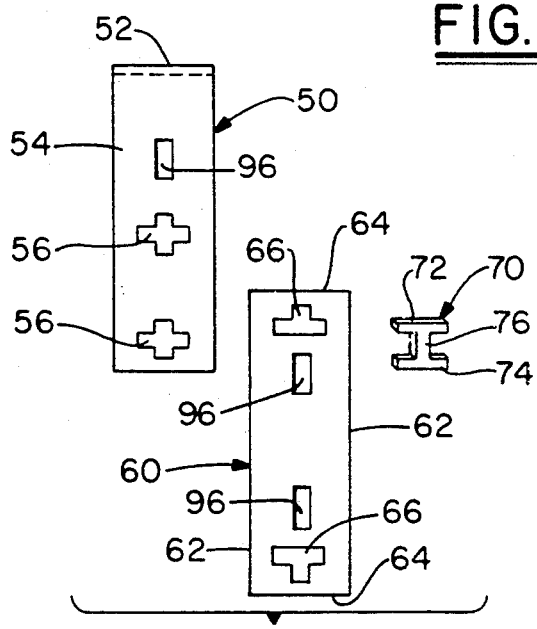
FIG. 5 is an elevational assembly drawing illustrating bracket and strap members and fastening means as may be applied to this invention.
Figure 6:
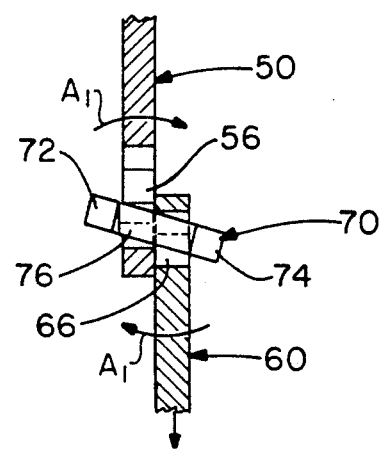
FIG. 6 is a side elevational view, in cross-section, of the bracket and strap components illustrating the manner of the fastener means interconnection.

The brackets 50, straps 60, and fastening means 70 are more clearly illustrated in FIGS. 5 and 6 of the drawings and it will be apparent that the purpose of these is to provide a means for hanging and maintaining the positions of the other members of the modular assembly 100. A fastening system of this type incorporating these elements is disclosed and also claimed in a co-pending application entitled FASTENING SYSTEM by Ernest A. Gardner and identified by Ser. No. 775,014 and now issued to U.S. Pat. No. 5,134,467 on Sep. 1, 1992. This co-pending application is incorporated in its entirety by reference herein.

More specifically, the brackets 50 are characterized by a substantially U-shaped configuration as defined by a main body portion 52 which extends into end portions 54 and these are bent from the body portion at an angle of 90 degrees with respect to the body portion. The end portions 54 have at least one slotted bore through the material comprising the bracket 50 and these may exhibit cross-shaped, T-shaped, and/or single longitudinally-shaped slotted bores 56, 66, and 96 respectively as illustrated in FIG. 5 of the drawings. The slotted bores are dimensioned such as to receive a fastening means 70 in a manner to be described hereinafter. While all of the brackets are preferably dimensionally identical, they may be used in various orientations as illustrated in FIG. 1 of the drawings. In addition, each bracket 50 has an overall width between the end portions 54 which is slightly greater than the overall widths of the channel member 10, the baffle member 30, and the pan 40. As clearly illustrated also in FIG. 2, the brackets 50 are intended to span the width-wise dimensions of these other members such that they may be fastened together in a vertical orientation and effect hanging of the channel 10, the pan 40, and a lighting fixture in a vertical orientation.

The strap members 60 are all identical pieces having a longitudinal length greater than the width as defined by side edges 62 and end edges 64. The straps 60 may be dimensioned to have a width dimension between the side edges 62 which is substantially equal to the width dimension of the brackets 50. Of course, the length of each strap 60 may be varied and this will depend upon certain vertical dimensions of the channel member 10, the elements carried by the pan 40, and the lighting fixture indicated at reference numeral 88 in the drawings. In any event, the straps 60 are characterized by at least one slotted bore through the material comprising the strap and such bore is located towards the end edges 64 and it may be a cross-shaped bore, a T-shaped bore, and/or a longitudinallyshaped bore as illustrated in FIG. 5.

The variously shaped bores 56, 66, and 96 which are made through the materials comprising the brackets 50 and straps 60 are designed for receiving a fastening means 70 in such a manner as to lock either of the brackets and/or straps together in a substantially vertical orientation. To effect a locking interconnection, the fastening means 70 comprises a member in a substantially I-shaped configuration. The I-shaped configuration is defined by a stem portion 76 having cross bar portions 72 and 74 orthogonally positioned at each of its ends. The cross bars 72,74 are substantially, but not exactly, equal to the lengthwise dimensions of the slotted bores 56,66, and 96 described hereinbefore and this is to allow for easy passage of the cross bars 72,74 through the bores. In similar manner, the stem portion 76 is dimensioned to easily fit into the slotted bores and its length between the cross bar portions 72 and 74 is slightly longer than the expected combined guage thickness dimension of the materials comprising the brackets 50 and/or the straps 60. As alluded to above, a fastener 70 may be used to connect brackets and/or straps 60 together and this is accomplished by passing, for example, the cross bar portion 72 through a slotted bore 56 in a bracket 50 and passing a cross bar portion 74 through a slotted bore 66 in a strap 60 and then moving the bracket and strap vertically relative to each other. As illustrated in FIG. 6, this relative positioning of the bracket and strap effects a seating engagement of the stem portion 76 of the fastener 70 within the bores 56,66 of the interconnected members. Obviously, the fastening means 70 forces the two members into a face-to-face planar orientation in the direction of arrow $A_1$ as shown in the drawing.

With respect to the slotted through bores 56, 66, and 96, it should be apparent that a fastening means 70 of the I-shaped configuration described above may be passed through the slotted bores 56,66 in a vertically oriented direction. However, with respect to the slotted bores 96, the fastener 70 must be turned a quarter turn such that the cross bars 72 and 74 may be passed therethrough and then turned a quarter turn back again to lock the fastener within the bore. In any of the slotted through bore configurations 56, 66, and/or 96 the cross bar portions 72,74 are passed completely through the material comprising the brackets 50 and/or straps 60 such that the cross bars 72,74 lie outside of the planes of the interconnected members. Thus, the cross bars 72,74 are aligned transversely to the lengthwise direction of the slotted through bores 56,66,96 when a fastener 70 is in seated engagement within the bores.

It will, of course, be recognized by those skilled and knowledgeable in the fastener arts that various other types of fastening means may be used to accomplish the same end. The invention, therefore, is not considered limited to the exact configuration of fastener shown and described suffice to say that, a fastener means 70 is utilized to maintain the brackets 50 and/or straps 60 in a substantially vertical interlocked alignment.

Figure 2:
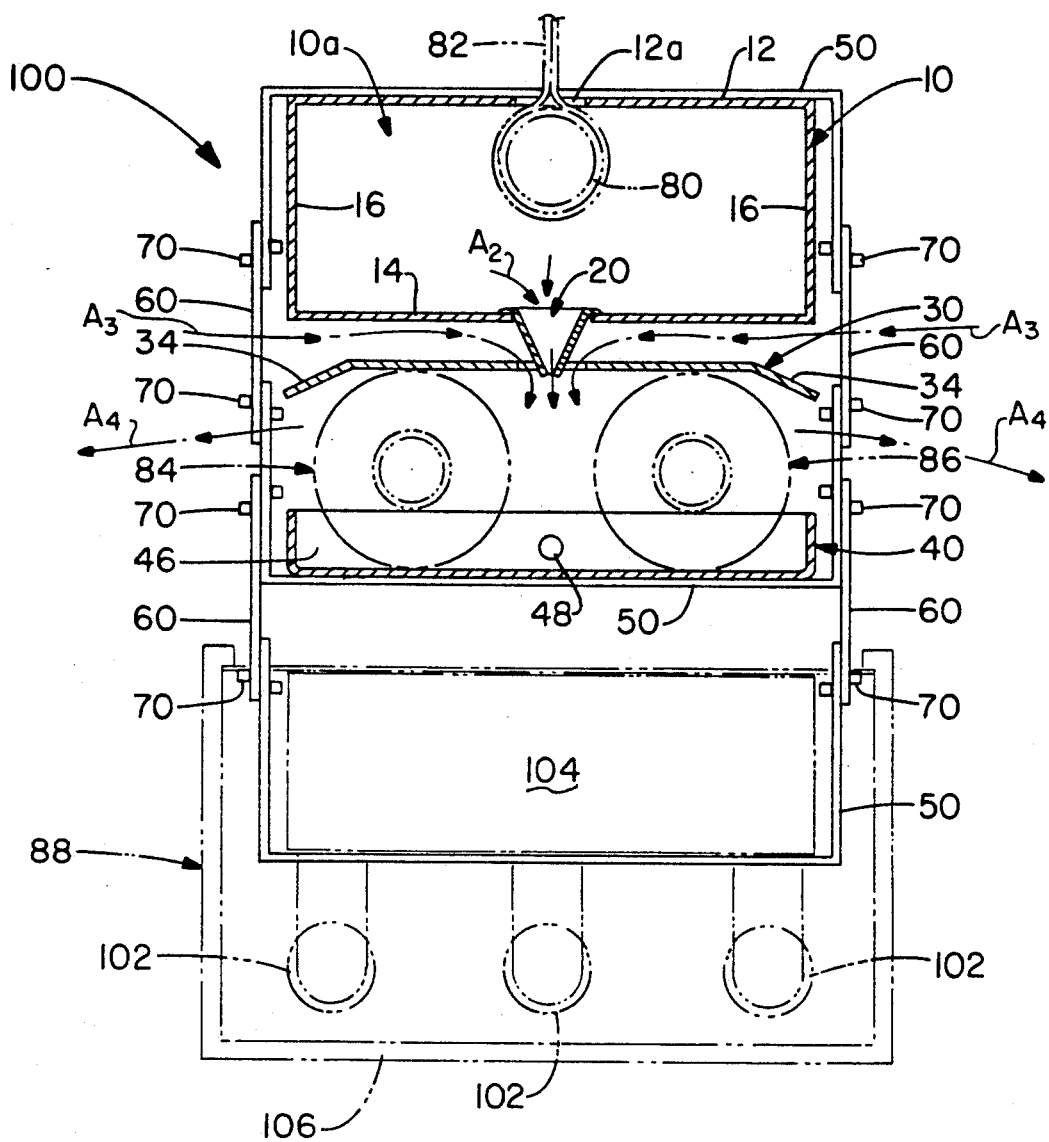
FIG. 2 is an end elevational view, in cross-section, of the modular assembly illustrated in FIG. 1 showing the members as they may be combined in an operational vertical orientation.

Referring now to FIG. 2 of the drawings, the various member elements which comprise the modular assembly 100 are illustrated as these may be used to functionally integrate fire safety sprinkler, heating/cooling, and lighting/communication systems into a unified and relatively compact vertical arrangement. The elements which form parts of the fire safety sprinkler, heating/cooling, and electrical lighting systems are illustrated in the drawing by way of dot-dashed ghost lines while the various members of the modular assembly 100 are shown in solid lines.

In FIG. 2, the channel member 10 is shown as it may be used to receive a water supply pipe 80 of a fire safety sprinkler system, the pipe 80 being longitudinally oriented within the bore 10a of the channel 10. Conventionally, sprinkler system piping is hung in close proximity to a ceiling structure (not shown) and routed throughout a building structure for the most advantageous coverage of floor space below. To accomplish this, a plurality of hanger straps 82 are used and these are fastened into the ceiling joist structure in a well-known manner. To accomodate the hangers 82, the channel member 10 will have at least two centrally and longitudinally positioned holes or bores 12a in the top wall 12 such that the strap hangers 82 may be passed therethrough and connected onto the supply pipe 80. Clearly, when the pipe hangers 82 are passed through the top wall 12 of a length of channel member 10 and connected to the sprinkler piping 80, the channel member will be captured onto the pipe in a substantially longitudinal alignment with the pipe.

During a building construction when the fire safety sprinkler system is being installed, it should be apparent that the trades doing the installation may have a number of channel members 10 available such that these may be installed at the same time as the sprinkler system piping 80. The channel members 10 will be installed in lengthwise end-to-end abutting arrangement such as to define an enclosed duct. During this phase of the sprinkler piping installation, the diffuser member 20 may also be installed within the bore 10a of the channel member 10. As illustrated in the drawing, the diffuser member 20 is mounted through the the longitudinal slot opening 18 within the bottom wall 14 of the channel member. The diffuser member 20 is maintained in position by way of its top flanges 28. Of course, it will be recognized that the diffuser member 20 may as well be installed within the slot opening 18 after the channel members 10 are installed on the pipe 80 and this may be accomplished by inserting one of the top flanges 28 up into the slot opening 18 and then bringing the other flange 28 up and snapping it into place within the slot.

It is anticipated that a heating/cooling system as may be applied to this invention may be comprised of a closed hot and cold fluid system using various configurations of heat exchangers many of which are already well-known in the industry. A particular one heat exchanger is illustrated in the drawings as an example and it may comprise finned-tube type exchangers generally indicated at reference numerals 84 and 86 in the drawings. Heat exchangers of this type and other types are available in various lengths and a preferable 48 in. length may be used to accomplish this function within the confines of the modular assembly 100.

In any event, once the channel members 10 are in place on the sprinkler system piping 80, a contractor may proceed to install the heat exchangers 84,86 for the heating/cooling system function. This is accomplished by placing lengths of heat exchangers 84,86 into a condensate pan 40 and covering these with a length of baffle plate 30 as illustrated in the drawing. This assembly may then be raised into position beneath the channel member 10 such that the longitudinal slot opening 36 in the top of the baffle plate 30 captures the depending end of the diffuser member 20 as illustrated. The assembly is held in position by brackets 50 and straps 60, one such bracket 50 being mounted over the top of the channel member 10 while another is mounted under the condensate pan 40 and these are interconnected together via the straps 60 and fastening means 70 as hereinbefore described with reference to FIGS. 5 and 6. At least two such bracket/strap combinations are required for a modular length of the channel member 10, the baffle member 30, and the condensate pan 40.

Continuing with reference to FIG. 2, an electrical lighting unit of a conventional type is generally indicated by reference numeral 88 as it may be hung beneath the assembly comprised of the channel member 10, the baffle member 30, and the condensate pan 40. The lighting system unit 88 is anticipated to comprise any of the well-known and/or available flourescent lighting fixtures and these are also available in various lengths. A 48 inch length, of course, may be used to advantage in accordance with this invention and, while a particular configuration of a 3-gang of light tubes 102 is shown in the drawing, it will be recognized that any of the various other configurations may as well be applied to the modular assembly 100. This invention, therefore, is not considered limited to the specific lighting fixture shown in the drawings.

As alluded to above, the lighting system fixture 88 is hung beneath the previously assembled members by way of a bracket 50 which is mounted between the fixture light tubes 102 and the unit control box 104. The bracket member 50 is connected to the lower bracket 50 which carries the condensate pan 40, and this, by way of a strap 60 and fastening means 70. Again, at least two such bracket/strap combinations will be required for the preferable length of lighting fixture 88. Finally, the lighting fixture 88 will conventionally include a transparent or translucent plastic cover 106 and these are affixed to the unit 88 by various known techniques and/or methods. The manner of doing this is not important as these covers may be made in many and various configurations.

Figure 3:
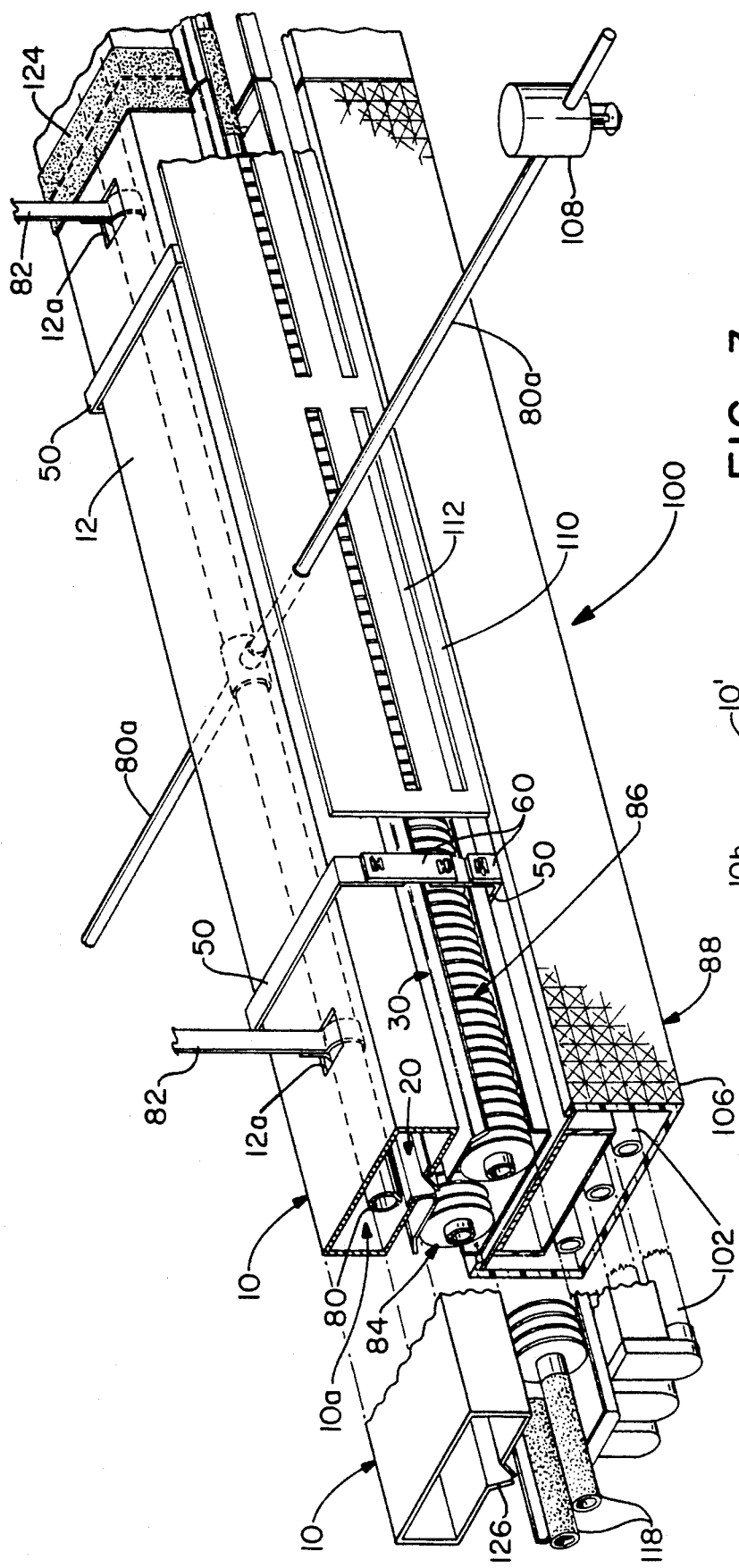
FIG. 3 is a perspective view, with portions being broken away, illustrating the component members of FIGS. 1 and 2 as these may be applied to integrating fire-safety sprinkler, heating/cooling, and electrical lighting/communication systems into a compact vertically oriented installation.

Referring to FIG. 3 of the drawings, a modular assembly 100 in accordance with the arrangement shown in FIG. 2 is illustrated in a perspective view as it may be applied to an installation including a building fire safety sprinkler system, a heating/cooling system, and an electrical lighting system. In some cases, communication wiring (not shown) may also be included for installation along with the modular assembly 100. As clearly illustrated, a channel member 10 is carried by sprinkler water supply piping 80 which is passed through the channel bore 10a and maintained in central longitudinal position by at least two pipe hangers 82. The pipe hangers 82 are obviously passed through access bores 12a in the top wall 12 of the channel member 10. A fire safety sprinkler system will, of course, include a number of branch pipes 80a which feed off of the main supply line 80 and these position various numbers of sprinkler heads 108 such as to cover a particular floor space area below. The branch pipes 80a may be connected into the main supply line 80 through access ports (not shown) in the side walls 16 of the channel member 10 and these may be cut out of the side walls by the contractor at the time of installation or, alternatively, may be provided as punch-outs when the channel member is fabricated. These may be provided at various spaced intervals in accordance with standard fire safety sprinkler specifications and to accomodate any possible spacings of the branch pipes 80a. In any case, it will be recognized that not every modular assembly 100 will have a sprinkler branch pipe 80a connected into it inasmuch as the assemblies 100 will preferably be about 48 inches in length and the spacing between adjacent branch pipes 80a may be greater than this distance apart.

Figure 4:
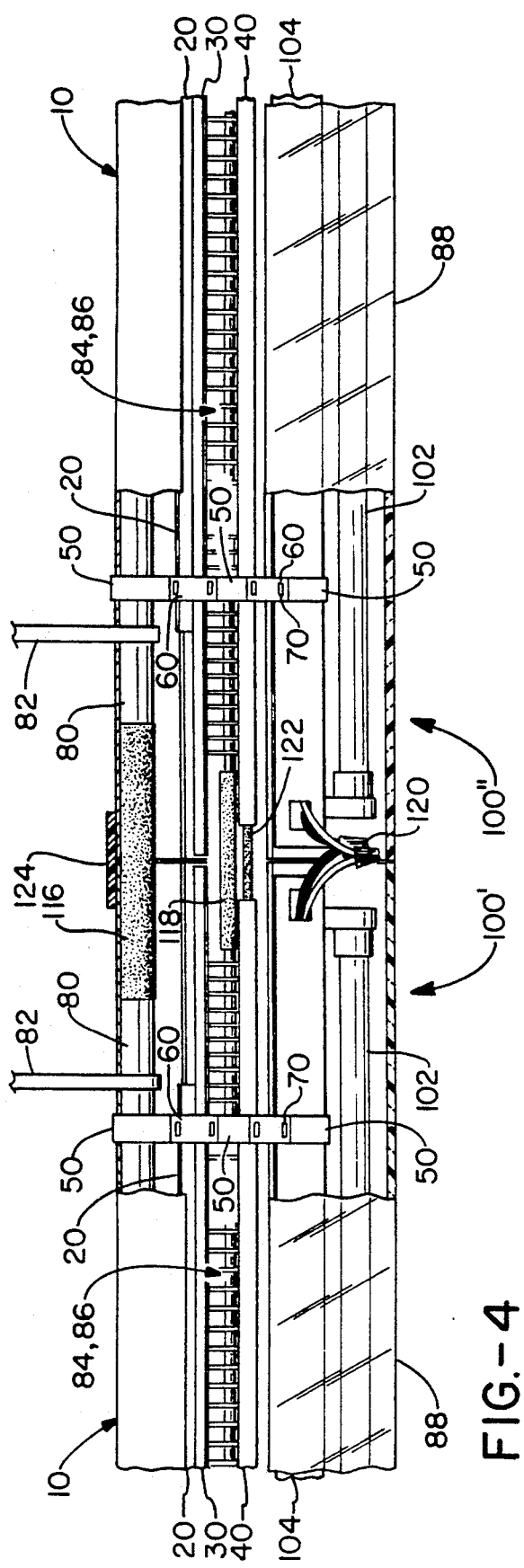
FIG. 4 is a side elevational view, with portions being broken away, illustrating various component interconnections as may be made between longitudinally and adjacently positioned modular assemblies of the type shown in FIG. 3.

In FIG. 3, a small portion of the left terminal end of a modular assembly 100 is broken away for the purpose of showing the vertically aligned orientation of the various member elements which comprise the heating and cooling and lighting systems as well as to illustrate various interconnections which may be made between end-to-end abutted modular assemblies. FIG. 4 may also be referred to, which figure illustrates in elevational view the various "soft" connections between longitudinally oriented elements of the various systems including the safety sprinkler supply line 80, the condensate pan members 40, the heat exchangers 84 and 86, and lighting system fixtures 88.

Referring now also to FIG. 4 of the drawings, this is a showing of the end-to-end abutting relationship of two modular assemblies and these are generally indicated by reference numerals 100' and 100". As clearly evident from both FIGS. 3 and 4, the tubes of the heat exchangers 84 and 86 may be interconnected at the juncture of two assemblies 100' and 100" by wave of lengths of flexible tubing or hose 118. Because the heating/cooling system is anticipated to comprise a closed hot and cold fluid system, the tubing 118 may be comprised of any suitable plastic and/or elastomeric material which will not be adversely affected by changes in temperature and/or by the type of fluid passing through the heat exchangers. When a cooling fluid is passed through the exchangers 84 or 86 in an air conditioning mode of operation, moisture may be condensed therein which will be collected in the condensate pans 40. Accordingly, condensate pans 40 of abutting modular assemblies 100' and 100" may be interconnected through the drain bores 48, and this, by way of short lengths of flexible tubing 122 as shown in the drawing. It will, of course, be recognized that at the end of a long run of interconnected modular assemblies 100 the end condensate pan 40 may be drained out into a suitable disposal drain.

The lighting fixtures 88 of a lighting system may also be interconnected together at the juncture of end-to-end abutting modular assemblies 100. This is accomplished using conventional wiring practices and by way of conventional wire connectors 120 as shown in FIG. 4. In this respect also it will become apparent to persons skilled and knowledgeable in this art that the modular assemblies 100 may be used to carry other types of power supply and/or communication wiring to remote locations where equipment may be installed which requires power and intelligence and which will also require the presence of fire safety sprinkler, heating/cooling, and lighting system functions. Obviously, such wiring may be fed through the channel member 10, through the lighting fixture 88, or be carried by the brackets 50 in a conventional manner.

Further with respect to FIG. 4, the main water supply pipe 80 for the fire safety sprinkler system will also be interconnected at various locations along its length. Because this pipe may be installed in longer lengths than the preferred 48 inch length of the modular assemblies 100, this connection will not be made at every juncture of modular assemblies. In any event, the interconnection of these pipes may be made by way of flexible tubing and/or hose 116 as shown in the drawing or in the conventional manner of interconnected pipes.

The channel members 10 are intended to form a closed duct which supplies make-up air for the heating-/cooling system. In this situation, the abutting channel members 10 will be sealed at their juncture by way of a plastic and/or elastomeric sleeve type device indicated at reference numeral 124 in FIGS. 3 and 4. The device 124 may be an extruded piece exhibiting various configurations such as to seal the juncture of two abutting channel members 10 and the manner of doing this is considered to be well within the knowledge and abilities of persons working in that art to perform.

In the normal operation of a heating/cooling system as may be applied to the modular assemblies 100, make-up room air for the living spaces below may be supplied through the enclosed duct formed by the end-to-end abutted channels 10. This air may be pumped into the duct at a design pressure determined for a particular length run of the duct and it will be passed downwardly out of the air duffusers 20 as indicated by the arrows $A_2$ in the showing of FIG. 2 of the drawings. The air moving downwardly out of the diffusers 20 creates a pressure drop at the bottom side of the baffle plate member 30 in the area of the slot opening 36 and this affect draws room air into the heat exchanger area as indicated by arrows $A_3$. The make-up air $A_2$ and room air $A_3$ are mixed in the volume space occupied by the exchangers 84,86 and it is either heated or cooled in the exchangers depending upon the particular function desired. The output air indicated by arrows $A_4$ is passed out of the sides of the exchangers between the baffle plate member 30 and the condensate pan 40 to the spaces below. In this respect, the modular assemblies 100 may be enclosed along the sides thereof with decorative panels 110 as illustrated in FIG. 3, which panels will include openings 112 for the passage of output conditioned air $A_4$. It will be obvious that the panels may also comprise any type of decorative covering including various types of screening. The covering along the sides of the modular assemblies 100, however, does not form a required element of this invention.

Figure 9:
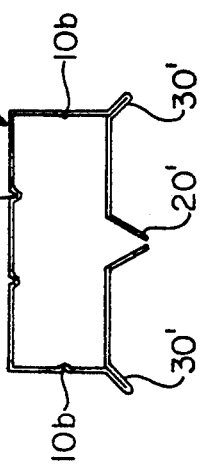
FIG. 9 is an end view of an alternative embodiment for the channel member of the modular assembly.
Figure 10:
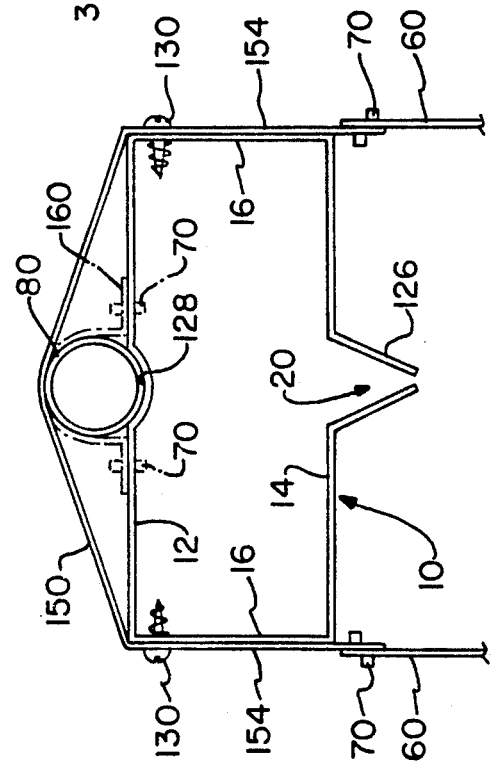
FIG. 10 is an end view illustrating another configuration of the channel member and the manner of hanging it from sprinkler system piping.

It will, of course, be recognized by those skilled in this art that various changes and/or modifications may made without departing from the spirit or scope of the invention. For example, it is anticipated that the diffuser member 20 may be formed as an integral part of the bottom walls 14 of the channel member 10. Accordingly, the side walls 22 of the diffuser member may be comprised of the wall material forming the bottom walls 14 and this particular variation is illustrated in the broken-away portion at the left of FIG. 3 and it is also illustrated in FIGS. 9 and 10 of the drawings. In FIG. 9, an additional variation of the channel member 10 is illustrated and indicated generally by reference numeral 10'. The channel member 10' is formed as a single unit and it includes an integral diffuser 20' and depending bottom flanges indicated at 30'. Obviously, the bottom flanges 30' operate to direct make-up air about the heat exchangers 84,86. In contradition to the original embodiment shown in FIG. 2, the channel member 10' of FIG. 9 may only be applied to supplying all room air via the channel duct as no provision is made for the addition of room air $A_3$ as shown in FIG. 2. This may be desirable in some instances and, therefore, the embodiment of FIG. 9 will be claimed herein.

In addition, it is anticipated that the straps 60 may not be used or even necessary if, for example, the side legs 54 of the brackets 50 are made longer and each side leg has a plurality of slotted bores through it at varying positions along the length of the leg. Thus, various fastening positions may be had by interconnected brackets 50.

Referring to FIG. 10 of the drawings, a variation of mounting of the channel member 10 is shown wherein the safety sprinkler pipe 80 is positioned outside and on top of the channel member 10. According to this embodiment, the channel member 10 is carried by the sprinkler pipe 80 by passing bracket members 50 over the pipe and fastening each side 54 into the side walls 16 via fastening means 70 or various type of self-tapping screws 130 as shown in the drawing. Because the bracket must span the distance over the pipe 80 its body portion 52 must of necessity be longer and therefore a particular bracket 150 having side leg extensions 154 may be supplied for this installation configuration. Of course, a bracket 150 may be fastened to another bracket 50 and/or strap 60 coming up from below as shown in FIG. 2 and as hereinbefore described. To facilitate maintaining the pipe 80 in a central longitudinal position along the length of a channel member 10, a concave depression 128 may be formed into the top wall 12. Alternatively, a pair of strengthening ribs 10$b$ may be formed into the top wall 12 and these may extend outwardly along the longitudinal length of the channel member to define such a depression or guide for the pipe 80. Ribs 10$b$ as shown in FIG. 9 may be sufficient when, as suggested above, they extend outwardly instead of inwardly as illustrated.

An alternative configuration for hanging the channel member 10 from below safety sprinkler piping is shown in FIG. 10 via dot-dashed ghost lines 160, The member 160 may may be similar to the brackets 50 or it may merely be a strap 60 which is formed over the pipe 80 and fastened into the top wall 12 of the channel by way of fastening means 70. The embodiments just described wherein the channel members 10 are fastened below safety sprinkler piping provides an advantage in that the sprinkler head branch pipes 80$a$ may be more easily connected into the main water supply pipe 80 of the sprinkler system, and this, irrespective of any channel member considerations.

Finally, it will be recognized that the various members which comprise the modular assembly 100 may be made and/or fabricated from any type of materials which will meet local building codes and/or regulations. This invention, therefore, is not considered limited in any way to the specific materials which may be applied to the various members of the modular assembly.

What is claimed is:

1. A modular assembly of multiple utility service equipment for installation in a building, which assembly includes fire-safety sprinkler system piping, heating and cooling system heat exchangers, and lighting system fixtures and communication wiring, the assembly comprising in combination:

sprinkler system piping means fixedly attached to a building structure;

a channel member having top, side, and bottom walls defining a substantially enclosed duct for the passage of air, the channel member being adapted for mounting in association with the sprinkler system piping means and having a longitudinally oriented slot opening through the bottom wall;

a condensate pan member having bottom, side, and end walls positioned at a spaced distance below the channel member;

heat exchanger means positioned in the pan member;

means positioned between the channel member and the heat exchanger means to direct air from out of the channel member to the space occupied by the heat exchanger means;

a lighting fixture positioned below the condensate pan member; and a plurality of U-shaped brackets mounted in vertically aligned positions along the length of the channel member, various of the brackets being mounted over the channel member and the sprinkler system piping means in a inverted position while the others of the brackets are mounted in upright position under the condensate pan member, said vertically aligned U-shaped brackets being interconnected together via fastening means to maintain the channel member, pan member and lighting fixture in position.

2. The modular assembly as claimed in claim 1 wherein the means to direct air comprises a substantially V-shaped diffuser member which is formed from the material comprising the bottom wall of the channel member.

3. The modular assembly as claimed in claim 1 wherein the means to direct air comprises a substantially V-shaped diffuser member which is inserted through the longitudinal slot opening in the bottom wall of the channel member and maintained in position within the slot by side flanges which extend along the lineal edges of the diffuser.

4. The modular assembly as claimed in claim 1 wherein the means to direct air comprises a substantially V-shaped diffuser member mounted in association with the longitudinal slot opening through the bottom wall of the channel member and a substantially flat baffle plate member having a central longitudinal slot opening through which the diffuser member is positioned.

5. The modular assembly as claimed in claim 1 wherein the channel member is characterized by at least two access openings through its top wall in spaced apart locations along its length such that sprinkler system pipe hangers may be passed therethrough and connected to the sprinkler system piping means which is passed through the duct formed by the channel member.

6. The modular assembly as claimed in claim 1 wherein the channel member is mounted beneath the sprinkler system piping means.

7. The modular assembly as claimed in claim 6 wherein an inverted U-shaped bracket is mounted over the piping means and fastened into the top wall of the channel member.

8. The modular assembly as claimed in claim 6, wherein an inverted U-shaped bracket is mounted over the piping means and fastened into the side walls of the channel member.

9. The modular assembly as claimed in claim 6 wherein an inverted U-shaped bracket is mounted over the piping means and fastened to an upright positioned bracket mounted beneath the condensate pan member.

10. The modular assembly as claimed in claim 6 wherein the channel member is characterized by longitudinal and outwardly extending spaced-apart ribs in the top wall of the channel member such as to maintain the channel centrally positioned with respect to the sprinkler system piping means.

11. The modular assembly as claimed in claim 6 wherein the channel member is characterized by a concave longitudinal depression within the top wall to receive the piping means.

12. The modular assembly as claimed in claim 1 wherein the channel member is characterized by longitudinal inwardly extending strengthening ribs formed in at least the top wall of the channel.

13. The modular assembly as claimed in claim 1 wherein the longitudinal length of the members is not more than 48 inches (1.22 meters).

14. The modular assembly as claimed in claim 1 wherein multiple assemblies are flexibly interconnected together in end-to-end positions beneath the sprinkler system piping means.

15. The modular assembly as claimed in claim 14 wherein the channel members are interconnected via a flexible sleeve membrane and the heat exchangers and condensate pan members are interconnected via flexible hoses.

16. The modular assembly as claimed in claim 4 wherein the diffuser member is characterized by side walls disposed at an angle within the range of 10–30 degrees with reference to a vertical axis.

17. The modular assembly as claimed in claim 16 wherein the side walls are disposed at an angle of 25 degrees and the diffuser opening is within the range of 0.001–0.10 inch (0.0254–2.54 mm).

18. The modular assembly as claimed in claim 1 wherein the U-shaped brackets are characterized by slotted through bores and the fastening means comprises an I-beam shaped member defined by a central body interconnecting cross bars at its ends, the cross bars being received through the slotted bores to lock vertically oriented brackets together.

19. The modular assembly as claimed in claim 18 wherein the slotted through bores are characterized by crossed horizontal and vertical slots.

20. The modular assembly as claimed in claim 18 wherein the slotted through bores are characterized by T-shaped slots.

21. The modular assembly as claimed in claim 18 wherein the slotted through bores are longitudinal and the fastening means must be rotated a quarter turn to lock an end bar behind a slot.

22. The modular assembly as claimed in claim 14 wherein communication wiring is routed through interconnected assemblies.

23. A modular assembly as may be applied to a building construction including a fire-safety sprinkler system, a heating and cooling heat exchanger system, an electrical lighting system, and a wiring system for power and communication to remotely located apparatus within the building, the modular assembly comprising in combination:

a sprinkler system piping means fixedly attached to a building structure;

a channel member defining an enclosed duct through which forced make-up air may be passed, the channel member characterized by a bottom wall which defines a V-shaped air diffuser having a longitudinal slot opening and a top wall adapted for a mounting association with the sprinkler system piping means such that the channel member is disposed longitudinally beneath the piping means;

a pan member positioned longitudinally at a spaced distance below the channel member;

heat exchanger means positioned between the pan member and the channel member;

a baffle plate member positioned above the heat exchanger means and beneath the channel member and and having a longitudinal slot opening through which the air diffuser of the channel member is positioned to create a venturi effect when forced make-up air passes downwardly out of the diffuser into the space surrounding the heat exchanger means to draw environmental ambient air through the baffle plate slot opening into the space surrounding the heat exchanger means for mixing with the forced make-up air; and a plurality of fasteners, straps, and U-shaped brackets in spaced-apart positions along the length of the assembly to maintain the vertical alignment of the channel member and pan member beneath the sprinkler system piping means, various of the brackets being inverted and mounted over the top of the channel member while other brackets are mounted upright beneath the pan member and straps and fasteners interconnect vertically aligned brackets together to form a unified structural assembly.

24. The modular assembly as claimed in claim 23 wherein the channel, pan member, and baffle plate members are in standard 48 inch (1.22 meters) lengths and a plurality of assemblies are interconnected end-to-end to form a run of assemblies.

25. The modular assembly as claimed in claim 24 wherein the channel members are interconnected via a flexible sleeve element and the pan members and heat exchanger means carried therein are interconnected via flexible hoses.

26. The modular assembly as claimed in claim 25 including a lighting fixture positioned beneath the pan member and maintained in position via fasteners, straps, and U-shaped brackets interconnected to brackets mounted beneath the pan member and end-to-end aligned fixtures are electrically interconnected together.

27. The modular assembly as claimed in claim 26 wherein wiring for power and communication to remotely located apparatus in the building are carried through the assemblies.

28. A modular assembly of multiple utility service equipment for installation in a building comprising in combination:

a sprinkler system piping means fixedly attached to a building structure;

a channel member defining an enclosed duct through which forced make-up air may be passed, the channel member having a top wall adapted for attachment to the sprinkler system piping means, and a bottom wall having at least one slot therein through which air from the channel member may pass;

a pan member positioned at a spaced distance below the channel member;

heat exchanger means positioned between the pan and the channel member;

deflector means positioned between the channel member and the heat exchanger means to direct air from the slot in the channel member to the space surrounding the heat exchanger means; and connector means suspending the pan member from the channel member.

29. The modular assembly as claimed in claim 28 including a lighting fixture positioned below the pan member and suspended from the connector means.

* * * * *